Aug. 16, 1932.　　　　O. REDWITZ　　　　1,871,558
NOODLE PRESS
Filed Nov. 7, 1930

Oscar Redwitz,
INVENTOR
BY Victor J. Evans
ATTORNEY

Patented Aug. 16, 1932

1,871,558

UNITED STATES PATENT OFFICE

OSCAR REDWITZ, OF SHARON, PENNSYLVANIA

NOODLE PRESS

Application filed November 7, 1930. Serial No. 494,158.

This invention relates to noodle presses and its general object is to provide a noodle making device that is primarily designed for home use, and where a small quantity of noodles is desired, and can be made and cooked by the same apparatus.

A further object of the invention is to provide a noodle press that is capable of making noodles of various lengths and thicknesses by merely adjusting the height of the press with respect to the container receiving the noodles therefrom.

A further object of the invention is to provide a noodle press, that is simple in construction, inexpensive to manufacture and efficient in operation and service.

This invention also consists in certain other features of construction and in the combination and arrangement of the several parts, to be hereinafter fully described, illustrated in the accompanying drawing and specifically pointed out in the appended claim.

In describing my invention in detail, reference will be had to the accompanying drawing wherein like characters denote like or corresponding parts throughout the several views, and in which.

Figure 1:
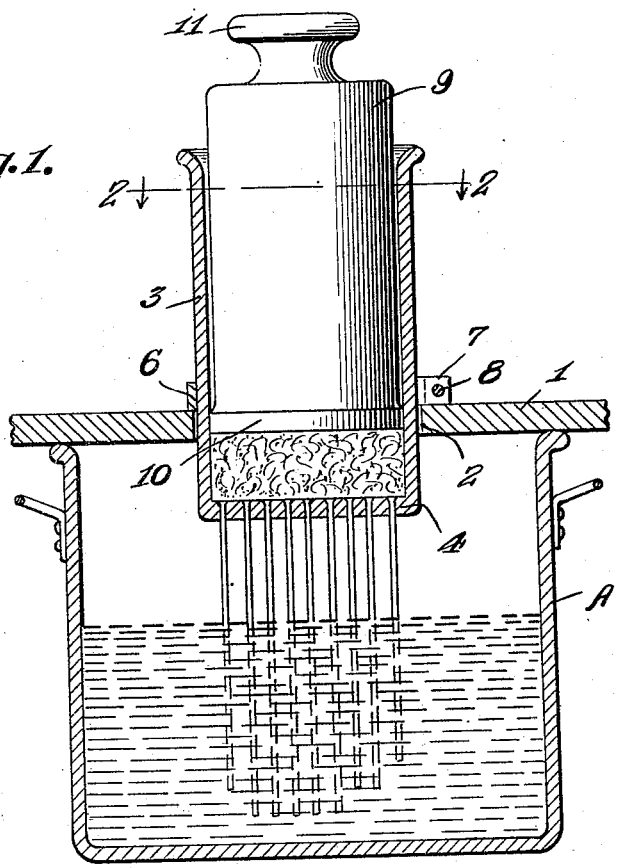
Figure 1 is a vertical sectional view taken transversely through the device forming the subject matter of the present invention and showing the same in use.
Figure 2:
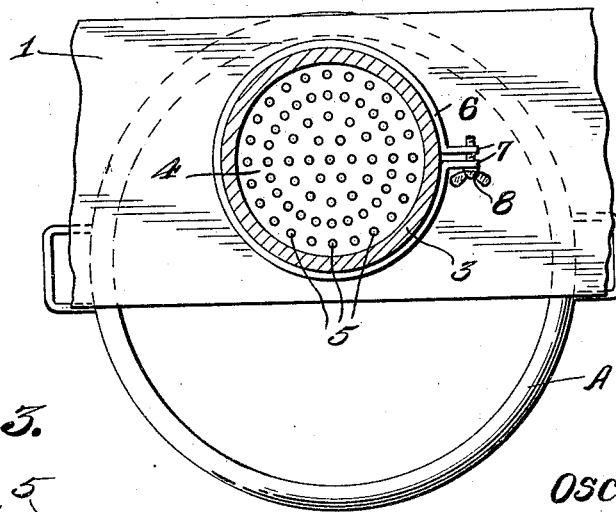
Figure 2 is a fragmentary top plan view with the plunger removed.

Referring to the drawing in detail, the letter A indicates a container which in fact is a cooking pan and which is adapted to support the noodle press which forms the subject matter of the present invention, the latter including a base 1 that is of a size to extend across the container as shown, and arranged in the base 1 is an opening 2 adapted to receive for passage therethrough a cylinder 3 that is provided with an outwardly flared upper end.

Figure 3:
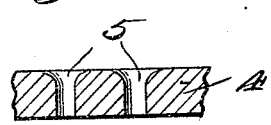
Figure 3 is a detail fragmentary view illustrating a portion of the perforated bottom of the cylinder.

The bottom of the cylinder 3 is indicated by the reference numeral 4 and is formed with a plurality of apertures 5 that have outwardly flared upper ends as will be noted upon inspection of Figure 3. The cylinder is supported upon the base 1 through the instrumentality of a circular band 6 that has formed with its ends parallel ears 7 apertured to receive a thumb screw 8. The circular band surrounds the cylinder 3 and is held accordingly by the thumb screw 8, and the band is of sufficient thickness so as to co-operate with the ears 7 to be supported upon the base 1 as clearly shown in Figure 1.

Mounted for reciprocation within the cylinder 3 is a plunger 9 that is provided with an enlarged ring portion 10 of a size to snugly fit the inner wall of the cylinder, and formed with and rising from the plunger 9 is a handle 11 whereby the plunger can be easily manipulated for pressing the contents of the cylinder through the apertures 5. The handle 11 is provided with a circumferentially arranged groove of channel formation so as to form a convenient hand hold.

From the above description and disclosure of the drawing it will be obvious that I have provided a noodle press that is very simple and the cylinder 3 is adapted to be filled with dough to the height desired, the plunger is then inserted as shown in Figure 1, and downward pressure upon the plunger will cause the dough to be passed through the apertures 5 to provide the noodles as shown, and in order to vary the length and thickness of the noodles, the height of the cylinder with respect to the water level in the container A is varied, it being apparent that when the cylinder is raised so that the bottom thereof is disposed adjacent the base, the noodles will be thin and short, due to the fact that they will stretch and tear off, but when the cylinder is disposed adjacent the bottom of the container, the noodles will be long and thick.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A noodle press comprising a cylinder having an outwardly flared upper end and being provided with a bottom with apertures arranged therein, said apertures having outwardly flared upper ends, a plunger for said cylinder, an enlarged ring portion formed with the bottom of said plunger and snugly engaging the wall of said cylinder, a handle for said plunger and being provided with an annular groove forming a hand hold, a base having an opening formed therein for the purpose of receiving said cylinder and adapted for engagement with the top of a receptacle, a band surrounding said cylinder for vertical slidable movement thereon, ears formed with said band, a thumb nut for said ears for securing the band in adjusted positions about the cylinder to support the latter through said opening at various distances above the bottom of said receptacle.

In testimony whereof I affix my signature.

OSCAR REDWITZ.